(12) United States Patent
Wang

(10) Patent No.: US 10,511,670 B2
(45) Date of Patent: Dec. 17, 2019

(54) TECHNIQUES FOR PROVIDING AUTHENTICATION INFORMATION TO EXTERNAL AND EMBEDDED WEB BROWSERS

(71) Applicant: Apple Inc., Cupertino, CA (US)

(72) Inventor: Hui Wang, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 15/387,475

(22) Filed: Dec. 21, 2016

(65) Prior Publication Data

US 2018/0176203 A1    Jun. 21, 2018

(51) Int. Cl.
*G06F 21/10* (2013.01)
*H04L 29/08* (2006.01)
*G06F 21/64* (2013.01)
*H04L 29/06* (2006.01)
*H04L 9/32* (2006.01)

(52) U.S. Cl.
CPC ............ *H04L 67/141* (2013.01); *G06F 21/10* (2013.01); *G06F 21/64* (2013.01); *H04L 9/32* (2013.01); *H04L 63/08* (2013.01); *H04L 63/0807* (2013.01); *H04L 63/168* (2013.01)

(58) Field of Classification Search
CPC ... H04L 63/08; H04L 63/168; H04L 63/0807; H04L 9/32; H04L 67/141; G06F 21/10; G06F 21/64
See application file for complete search history.

(56) References Cited

U.S. PATENT DOCUMENTS 6,718,328 B1 *   4/2004   Norris ................... G06F 21/10
                                                  707/758
6,851,060 B1 *   2/2005   Shrader ............ G06F 17/30861
                                                  707/999.009

(Continued)

OTHER PUBLICATIONS

D. Fett, R. Küsters and G. Schmitz, "An Expressive Model for the Web Infrastructure: Definition and Application to the Browser ID SSO System," 2014 IEEE Symposium on Security and Privacy, San Jose, CA, 2014, pp. 673-688. (Year: 2014).*

(Continued)

*Primary Examiner* — Kari L Schmidt
(74) *Attorney, Agent, or Firm* — Dickinson Wright RLLP

(57) ABSTRACT

Representative embodiments set forth herein disclose techniques for enabling a client application to supplement its features by utilizing the functionalities provided by a web browser in a secure manner. According to some embodiments, the client application can authenticate with an authentication server to establish a trusted connection between the client application and the authentication server. In turn, the client application can issue a request to the authentication server for particular content. Next, the authentication server can establish a "content uniform resource locator (URL)" for accessing the content, and interface with a web server to establish an "authentication URL", and return both the content URL and the authentication URL to the client application. In turn, the client application invokes an instance of the web browser and causes the web browser to access the authentication URL to obtain session information, and subsequently access the content URL to obtain the content.

20 Claims, 10 Drawing Sheets

(56) References Cited

U.S. PATENT DOCUMENTS

| | | | | |
|---|---|---|---|---|
| 7,093,020 | B1* | 8/2006 | McCarty | H04L 67/14 709/229 |
| 7,240,192 | B1* | 7/2007 | Paya | H04L 63/0807 713/152 |
| 7,475,146 | B2* | 1/2009 | Bazot | G06F 21/41 709/227 |
| 8,291,490 | B1* | 10/2012 | Ahmed | G06F 21/604 726/17 |
| 9,385,999 | B2* | 7/2016 | Kanungo | H04L 63/0435 |
| 9,794,240 | B2* | 10/2017 | Liu | G06F 17/30887 |
| 2002/0010756 | A1* | 1/2002 | Oku | H04L 29/06 709/217 |
| 2003/0145103 | A1* | 7/2003 | Pruyne | H04L 29/06 709/237 |
| 2004/0088210 | A1* | 5/2004 | Tsyganskiy | G06Q 30/02 705/7.33 |
| 2005/0050317 | A1* | 3/2005 | Kramer | G06F 21/606 713/155 |
| 2005/0177630 | A1* | 8/2005 | Jolfaei | G06F 21/6227 709/224 |
| 2007/0136794 | A1* | 6/2007 | Chin | H04L 63/0807 726/5 |
| 2008/0127323 | A1* | 5/2008 | Soin | G06F 21/31 726/12 |
| 2009/0144806 | A1* | 6/2009 | Gal | H04L 63/083 726/3 |
| 2010/0192210 | A1* | 7/2010 | Purdy, Sr. | G06F 21/10 726/7 |
| 2011/0078333 | A1* | 3/2011 | Jakubowski | H04L 67/1095 709/248 |
| 2013/0019295 | A1* | 1/2013 | Park | H04L 9/3213 726/7 |
| 2013/0262696 | A1* | 10/2013 | Watanabe | H04L 45/00 709/238 |
| 2014/0006562 | A1* | 1/2014 | Handa | H04L 67/02 709/219 |
| 2014/0047018 | A1* | 2/2014 | Schmidt | H04L 67/08 709/203 |
| 2014/0082123 | A1* | 3/2014 | Hasuo | H04L 67/2842 709/213 |
| 2014/0150078 | A1* | 5/2014 | Wu | G06F 21/41 726/8 |
| 2014/0282788 | A1* | 9/2014 | Inao | H04N 21/23106 725/115 |
| 2015/0007299 | A1* | 1/2015 | Grajek | H04L 63/083 726/8 |
| 2016/0366118 | A1* | 12/2016 | Wang | H04L 63/083 |

OTHER PUBLICATIONS

C. Bansal, K. Bhargavan and S. Maffeis, "Discovering Concrete Attacks on Website Authorization by Formal Analysis," 2012 IEEE 25th Computer Security Foundations Symposium, Cambridge, MA, 2012, pp. 247-262. (Year: 2012).*

Ghiani, Giuseppe, Fabio Paternò, and Lorenzo Isoni. "Security in migratory interactive web applications." Proceedings of the 11th International Conference on Mobile and Ubiquitous Multimedia. p. 15. ACM, 2012. (Year: 2012).*

* cited by examiner

TECHNIQUES FOR PROVIDING AUTHENTICATION INFORMATION TO EXTERNAL AND EMBEDDED WEB BROWSERS

FIELD

The described embodiments relate generally to authentication techniques between software entities executing on computing devices. More particularly, the described embodiments relate to techniques for enabling client applications on client devices to provide authentication information to external and/or embedded web browsers executing on the client devices to obtain content from server devices in a secure manner.

BACKGROUND

Continual advancements in computer hardware and software development are leading to ever-increasing user expectations for rich features, e.g., high-definition video playback, music playback, document rendering, and the like. As a result, software developers are faced with requirements to build these rich features from the ground up, despite the fact that in many cases, such features have already been developed on another platform or in a neighboring application. Consider, for example, a developer who is building a native application—e.g., one that executes directly on an operating system (OS) of a computing device and utilizes a framework available within the OS. In this example, the developer is faced with a requirement to implement a rich feature (e.g., high-definition video playback according to the H.264 standard) that is already supported by a standard web browser that is accessible to the native application. Unfortunately, in many cases it can be unacceptable for the developer to utilize the standard web browser through conventional means (e.g., Application Programming Interface (API) calls). For example, the native application may be tasked with displaying privileged content that should not be passed directly to the web browser, as such an implementation could pose considerable security risks. Consequently, the developer is faced with building the rich feature from the ground up, which is wasteful and often leads to sub-par results.

SUMMARY

Accordingly, representative embodiments set forth herein disclose various techniques for enabling a client application on a client device to provide authentication information to external and/or embedded web browsers executing on the client device to obtain content from one or more server devices in a secure manner.

One embodiment sets forth a method implemented by an authentication server application executing on a computing device. According to some embodiments, the method includes the steps of (1) receiving and authorizing credentials provided by a client application executing on a remote computing device, (2) providing an authorization token to the client application, (3) receiving, from the client application, a first request to access content provided by a web server application, where the first request includes the authorization token, and (4) when the authorization token is valid: (5) generating a content uniform resource locator (URL) for accessing the content, (6) issuing, to the web server application, a second request for an authentication URL that enables a web browser on the remote computing device to obtain a session cookie from the web server application, where the session cookie enables the web browser to access the content by way of the content URL, (7) receiving, from the web server application, the authentication URL, and (8) providing, to the client application, (i) the authentication URL, and (i) the content URL.

Another embodiment sets forth a method implemented by a web server application executing on a computing device. According to some embodiments, the method includes the steps of (1) receiving, from an authentication server application, a first request for an authentication URL that enables a web browser on a remote computing device to obtain a session cookie from the web server application, where the session cookie enables the web browser to access content by way of a content URL, (2) generating and providing the authentication URL to the authentication server application, (3) receiving, from the web browser, a second request formed by way of accessing the authentication URL, (4) interfacing with the authentication server application to determine whether the authentication URL is valid, and (5) when the authentication URL is valid: providing the session cookie to the web browser.

Yet another embodiment sets forth a method implemented by a client application executing on a computing device. According to some embodiments, the method includes the steps of (1) providing credentials to an authentication server application, (2) receiving an authorization token from the authentication server application, (3) providing, to the authentication server application, a first request to access content provided by a web server application, where the first request includes the authorization token, (4) receiving, from the authentication server application, (i) an authentication URL, and (i) a content URL associated with the content, (5) causing a web browser to access the authentication URL, and (6) when the web browser obtains a session cookie from the web server application: (7) providing the content URL to the web browser, and (8) causing the web browser to access the content URL and receive the content from the web server application.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
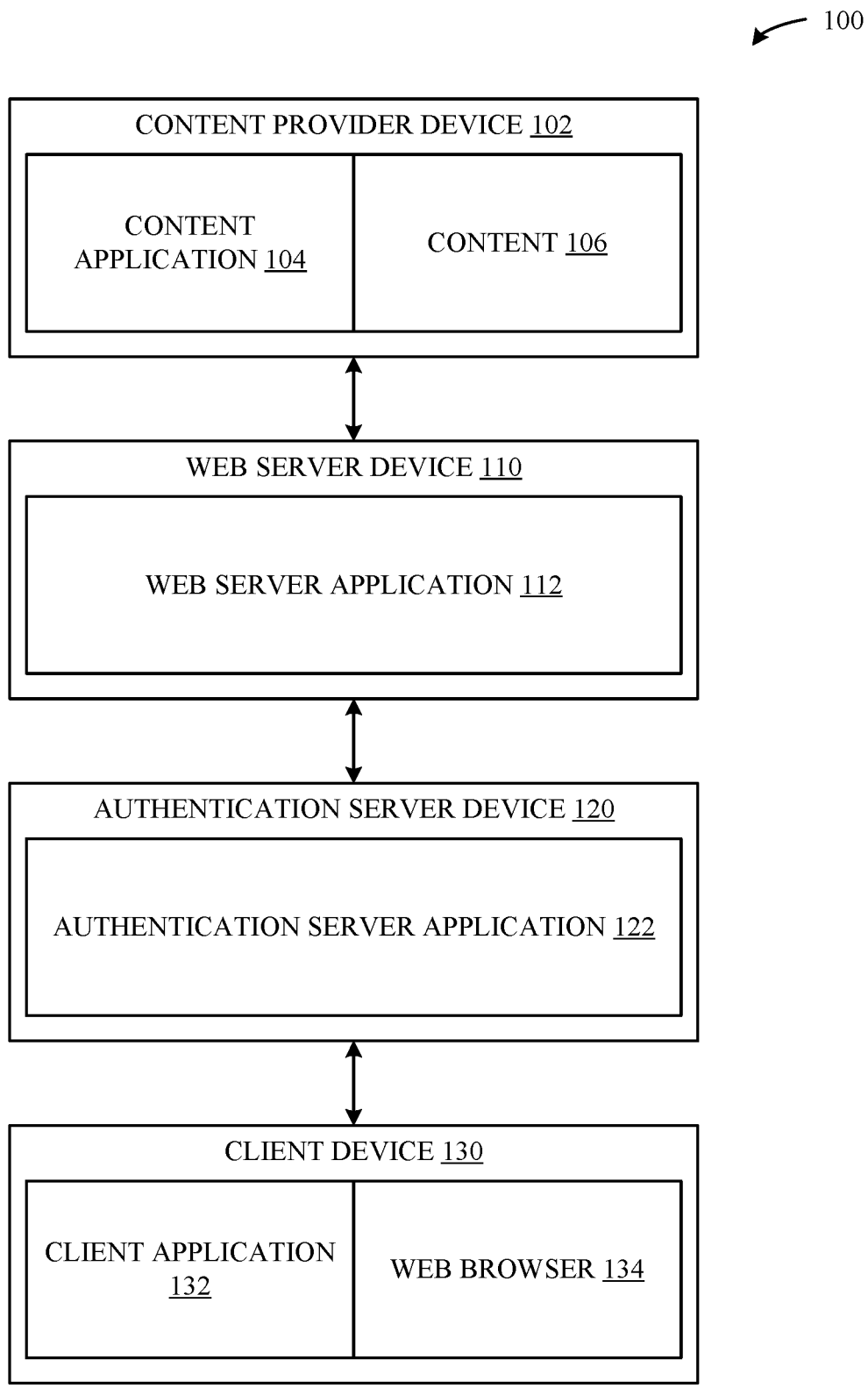
FIG. 1 illustrates a system of different computing devices that can be configured perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Representative embodiments described herein set forth a technique for enabling a client application executing on a client computing device to utilize—in a substantially secure manner—the various functionalities provided by a web browser installed on the client computing device. According to some embodiments, the client application can be configured to authenticate with an authentication server as a preliminary step to establish a trusted connection between the client application and the authentication server. In turn, when the client application is seeking to obtain particular content to be rendered on the computing device by way of the web browser, the client application can issue a request to the authentication server for the particular content. In response, the authentication server can establish a one-time use "content uniform resource locator (URL)" for accessing the content, and issue, to a web server, a request for a one-time use "authentication URL" that, when accessed by the web browser, will provide the web browser with the necessary security information (e.g., a session cookie) to effectively obtain the content through the content URL. In turn, the authentication server returns both the content URL and the authentication URL to the client application, whereupon the client application invokes an instance of the web browser. According to some embodiments, the instance of the web browser can be in an embedded form within the client application, or in a standalone (i.e., external) form to the client application. Next, the web browser accesses the authentication URL to obtain the session cookie (as described above), and subsequently accesses the content URL to obtain the content. In turn, the web browser can render the content as appropriate (e.g., play a video or music, rendering an image, document, animation, etc.).

Accordingly, the techniques set forth herein enable client applications to supplement their provided functionality by utilizing web browser functionality in a highly secure manner. A more detailed description of these techniques is provided below in conjunction with FIGS. 1-7.

FIG. 1 illustrates a system 100 of different computing devices that can be configured perform the various techniques described herein, according to some embodiments. As shown in FIG. 1, the system 100 can include a content provider device 102, a web server device 110, an authentication server device 120, and a client device 130. According to some embodiments, each of the content provider device 102, the web server device 110, the authentication server device 120, and the client device 130 can be configured to execute respective applications that enable these computing devices to carry out the various techniques described herein. For example, content provider device 102 can be configured to execute a content application 104 (e.g., a data repository), web server device 110 can be configured to execute a web server application 112 (e.g., macOS Server by Apple®), authentication server device 120 can be configured to execute an authentication server application 122 (e.g., FileMaker Server by FileMaker®), and client device 130 can be configured to execute a client application 132 (e.g., FileMaker Pro by FileMaker®). Notably, and although not illustrated in FIG. 1, it is well-understood that these computing devices can include various hardware components that enable the execution of the respective applications. For example, these devices can include at least one storage device (e.g., a solid state drive, a hard drive, etc.), at least one processor (e.g., a multi-core central processing unit (CPU)), and at least one memory (e.g., a random access memory (RAM)) into which an operating system (OS) can be executed, where the OS can be configured to load/execute the respective applications.

According to some embodiments, the content provider device 102—specifically, content application 104 executing on content provider device 102—can be configured to provide various content 106 to client device 130 (by way of web server device 110/authentication server device 120, as described in greater detail herein). According to some embodiments, content 106 can include any form of digital media, e.g., image files, video files, audio files, document files, and so on. It is noted that content 106 can be locally-accessible (e.g., through local storage or network storage) to content provider device 102, and/or remotely-accessible (e.g., through cloud-based storage via an Internet connection). A more detailed breakdown of the various functionalities provided by content provider device 102 is set forth below in conjunction with FIGS. 2-3, 4A-4B, and 5A-5B.

According to some embodiments, web server device 110—specifically, web server application 112—can be configured to interface with content provider device 102, authentication server device 120, and client device 130 in a variety of capacities to implement the various techniques described herein. For example, web server device 110 can interact with authentication server device 120 in order to provide content 106 to a client application 132 executing on client device 130. In turn, client application 132 can cause a web browser 134 to execute—either in an embedded form within the client application 132, or in a separate window external to client application 132—and receive content 106 from content provider device 102. A more detailed breakdown of the various functionalities provided by web server device 110 is set forth below in conjunction with FIGS. 2 and 5A-5B.

According to some embodiments, authentication server device 120—specifically, authentication server application 122—can be configured to interface with web server device 110 and client device 130 in a variety of capacities to implement the techniques described herein. For example, authentication server device 120 can interact with client application 132 executing on client device 130 to authenticate client application 132. In turn, authentication server device 120 can interface with web server device 110 to establish secure, one-time use URLs for client application 132 to enable content 106 to be obtained and displayed within a web browser 134 under the control of client application 132. A more detailed breakdown of the various functionalities provided by authentication server application 122 is set forth below in conjunction with FIGS. 2 and 4A-4B.

According to some embodiments, client device 130—specifically, client application 132—can be configured to interface with authentication server device 120 and web server device 110 to obtain content 106 for display within a web browser 134. For example, client device 130 can authenticate with authentication server device 120. In turn, when client device 130 issues requests for content 106 to authentication server device 120, authentication server device 120 interfaces with web server device 110 to establish secure, one-time use URLs that enable the web browser 134 to display the content 106 under the control of client application 132. A more detailed breakdown of the various functionalities provided by client application 132 is set forth below in conjunction with FIGS. 2-3.

Additionally, it is noted that although the different computing devices discussed herein are illustrated in a singular form in FIG. 1, the embodiments set in are not so limited. On the contrary, system 100 can include multiple content provider devices 102, web server devices 110, authentication server devices 120, and client devices 130 that are collectively configured to implement the techniques described herein. For example, multiple content provider devices 102 can be configured to provide content 106 to multiple web server devices 110 (and ultimately to multiple client devices 130). Moreover, multiple web server devices 110 can be configured to interface with multiple authentication server devices 120/client devices 130. Further, multiple authentication server devices 120 can be configured to interface with multiple client devices 130. It is additionally noted that web server device 110 and authentication server device 120 can be incorporated into a single computing device, e.g., a server computing device configured to implement both web server application 112 and authentication server application 122. Additionally, this server computing device can incorporate the functionality provided by content provider device 102, e.g., by configuring web server application 112 to access content 106 that is accessible (e.g., on a local, network, or remote storage) and provide the content 106 to client devices 130.

Figure 2:
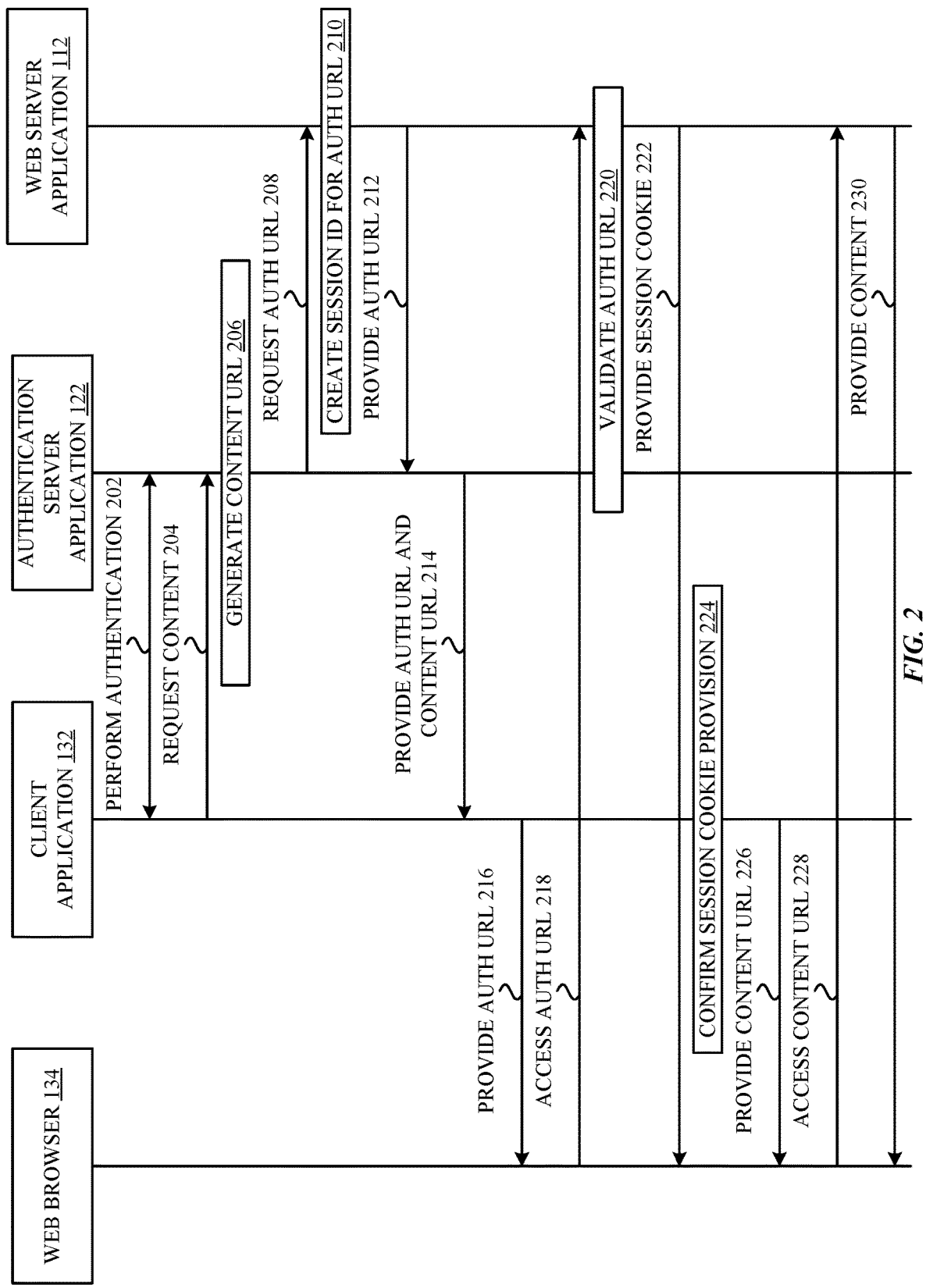
FIG. 2 illustrates a high-level sequence diagram of a method for performing the authorization and content delivery techniques described herein, according to some embodiments.

FIG. 2 illustrates a high-level sequence diagram of a method 200 for performing the authorization and content delivery techniques described herein, according to some embodiments. As shown in FIG. 2, the method 200 begins at step 202, where a client application 132 (executing on a client device 130) and an authentication server application 122 (executing on an authentication server device 120) carry out an authentication procedure. The authentication procedure can involve, for example, client application 132 providing credentials that include a username and password combination that is known to authentication server application 122. It is noted that this username and password authentication procedure is merely exemplary and that the client application 132 and authentication server application 122 can utilize any known authentication techniques, e.g., certificate-based authentications, biometric-based authentications, and so on. In any case, at the conclusion of step 202, client application 132 and authentication server application 122 have established a trusted connection through which client application 132 can issue requests for content 106, as described below in greater detail.

At step 204, client application 132 issues a request to the authentication server application 122 for particular content 106. Client application 132 can issue the request in response to, for example, receiving a request from a user to load a video file for playback at the client device 130 on which client application 132 is executing. In another example, the request can be automatically issued in response to the completion of step 202, e.g., loading a home screen interface that a user of client application 132 expects to see after he or she authenticates with authentication server application 122. In any case, the request references the content 106 and is formed by client application 132 according to a format that is understood by authentication server application 122. In this manner, the authentication server application 122 can take appropriate action upon receiving the request, which is described below in greater detail at step 206.

At step 206, authentication server application 122 receives the request generated by client application 132, and, in turn, generates a content URL for the content 106 specified in the request. According to some embodiments, the content URL can be generated using a variety of techniques, e.g., authentication server application 122 can reference a lookup table in which an index-based unique identifier (ID) associated with the content 106 (and provided in the request) is linked to a corresponding file path that is accessible to web server application 112. Consider, for example, a scenario in which the index-based unique ID is "24938", and the corresponding file path is " . . . /client_123/videos/TutorialVideo.avi". Continuing with this example, authentication server application 122 can generate the content URL based on this information. According to some embodiments, the content URL is a one-time use URL that enables client device 130, or any device or application, to access the content 106 only one time. For example, the content URL can reference a link to " . . . client_123/ak923jdko9s09231k90d", which exposes neither the unique ID nor the file path associated with the content 106. As described in greater detail herein, the content URL—when accessed by client device 130—enables client device 130 to obtain the content 106, whereupon the content URL is invalidated (thereby effecting the one-time use property). In other words, if, at a subsequent time, a malicious client device attempts to access the content URL, then the request will be ignored by web server application 112, as the content URL is invalidated.

It is noted that authentication server application 122 and web server application 112 can be privy to the content URL generated at step 206 regardless of the configuration of 122 and web server application 112. For example, when authentication server application 122 and web server application 112 are executing on separate computing devices, authentication server application 122 can be configured to provide the content URL—as well as accompanying information, e.g., the corresponding file path—to web server application 112 after generating the content URL at step 206. In another example, when authentication server application 122 and web server application 112 are implemented within a same device, are communicating via a trusted connection, etc., they can share access to a data structure (e.g., a database table) that maintains the content URLs generated by authentication server application 122. In this manner, when web server application 112 receives a request (from a web browser 134) by way of a content URL (e.g., at step 228 described below), web server application 112 can reference the information included in the content URL, identify the corresponding file path for the content 106, and deliver the content 106 to the web browser 134.

At step 208, authentication server application 122 issues a request to web server application 112 for an authentication URL. According to some embodiments, the authentication URL can also be a one-time use URL that is provided to client application 132 in accordance with the techniques described herein. In particular, and as described below in greater detail in conjunction with steps 218-224, the authentication URL ultimately is provided to client application 132. In turn, client application 132 invokes a web browser 134—either in an embedded form for display within a user interface of client application 132 or in an external form that is displayed separate from the user interface of client application 132—and causes the web browser 134 to access the authentication URL. In doing so, the web browser 134 and web server application 112 establish a trusted relationship prior to the web browser 134 issuing a request to web server application 112 for the content 106 (by way of accessing the content URL), thereby enabling the various security benefits described herein.

At step 210, web server application 112 creates a session ID in association with the authentication URL. According to some embodiments, and as described below in greater detail in conjunction with steps 218-224, the session ID corresponds to a session cookie that web server application 112 provides to the web browser 134 in response to the web browser 134 accessing the valid authentication URL. According to some embodiments, the session cookie can include information that enables the web browser 134 to establish the trusted relationship previously described above, where the trusted relationship enables the web browser 134 to effectively retrieve the content 106 via the content URL (at steps 228-230, described below in greater detail).

At step 212, web server application 112 provides the authentication URL to the authentication server application 122, where, in turn, at step 214, authentication server application 122 provides (1) the authentication URL, and (2) the content URL to client application 132. In this manner, client application 132 is now equipped with two one-time use URLs that will enable a web browser 134 executing on client device 130 to (1) authenticate with web server application 112, (2) retrieve the content 106 originally requested at step 204, and (3) display the content within the web browser 134.

At step 216, client application 132 provides the authentication URL to a web browser 134. According to some embodiments, client application 132 invokes an instance of web browser 134 in conjunction with providing the authentication URL, or accesses an instance of a web browser 134 already executing on client device 130. For example, client application 132 can access an Application Programming Interface (API) available on client device 130 to request an invocation of a default (or a specific) web browser installed on client device 130. For example, client application 132 can issue API commands that cause an instance of the default web browser to load and execute on client device 130 either in an embedded form within client application 132 or in a window that is external to client application 132. Alternatively—or additionally—client application 132 can interface with web browsers 134 through other means, e.g., inter-application messaging, mouse/keystroke emulations, and so on. A more detailed breakdown of embedded and external web browser 134 instances is set forth below in conjunction with FIG. 6.

At step 218, the web browser 134 accesses the authentication URL. According to some embodiments, client application 132 can cause the web browser 134 to access the authentication URL by way of API commands. For example, client application 132 can obtain an object that references the instance of the web browser 134, and utilize functions associated with the object to cause the web browser 134 to access the authentication URL. In any case, when the web browser 134 accesses the authentication URL, the web browser 134 forms a web request that is directed to web server application 112 (in accordance with the properties of the authentication URL).

At step 220, web server application 112 receives the web request issued as a result of step 218, and attempts to validate the authentication URL. According to some embodiments, web server application 112 can interface with authentication server application 122 to determine whether the authentication URL is valid, as both web server application 112 and authentication server application 122 are privy to the authentication URL (and its validity). In turn, and when the authentication URL is valid, web server application 112 at step 222 provides a session cookie to the web browser 134. As previously described herein, the session cookie can be based on the session ID created for the authentication URL, where the session cookie includes information—e.g., additional authentication information—that enables the web browser 134 to access the content 106 by way of the content URL (described below in conjunction with steps 228-230). According to some embodiments, step 222 can also involve web server application 112 and authentication server application 122 updating a configuration so that the session cookie is not provided to any other web browser 134 or other device or software, thereby preventing additional requests formed by accessing the authentication URL from being validated.

At step 226, client application 132 confirms the provision of the session cookie to the web browser 134. According to some embodiments, client application 132 can confirm the provision of the session cookie using the above-described API commands. For example, client application 132 can register an event handler that is triggered any time a change is made to the cookies managed by the web browser 134. In this manner, when the web browser 134 obtains the session cookie, client application 132 becomes aware (by way of the event handler) that web browser 134 now possesses the session cookie that is required to effectively access the content URL. Accordingly, at step 228, client application 132 provides the content URL to the web browser 134, and causes the web browser 134 to access the content URL at step 228. According to some embodiments, when the web browser 134 access the content URL, the web browser 134 can form a web request based on the content URL, where the web request includes (or is accompanies by) information associated with the session cookie received at step 222. In particular, and as previously described herein, web server application 112 will require this information when validating the web request formed based on the content URL, as this information validates that the web browser 134 successfully underwent the authentication process described above in conjunction with steps 202-222.

In turn, at step 230, web server application 112 validates the content URL and provides the content 106 to the web browser 134. As previously described herein, obtaining the content 106 can involve referencing the content URL against information managed by authentication server application 122 and web server application 112 to identify the file path of the content 106. In turn, web server application 112 can obtain the content 106 via the file path and provide the content 106 to the web browser 134, thereby satisfying the web request formed in association with accessing the content URL at step 228.

Figure 3:
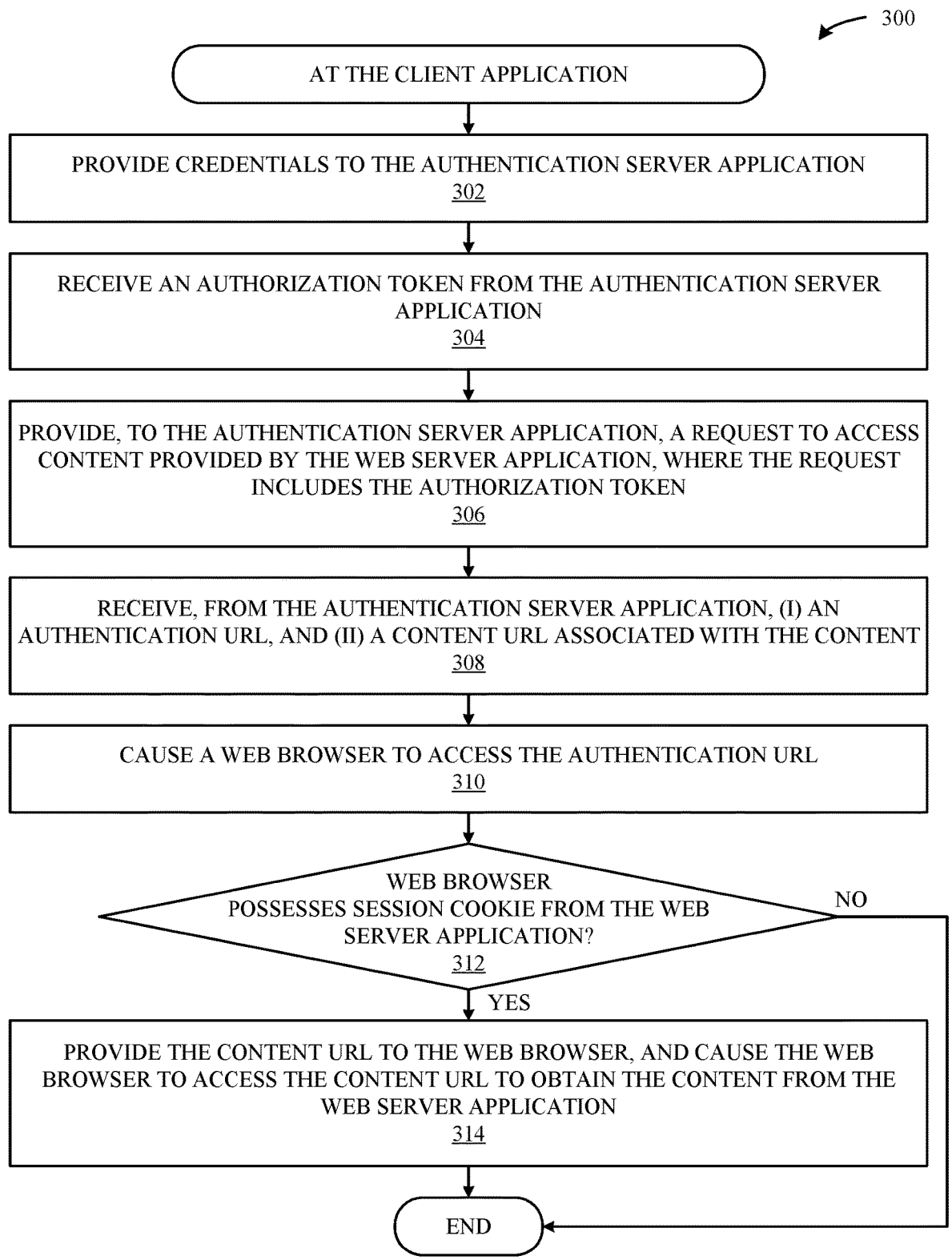
FIG. 3 illustrates a method performed by a client application executing on a client device, according to some embodiments.

FIG. 3 illustrates a method 300 performed by client application 132, according to some embodiments. In particular, the method 300 provides a more detailed breakdown of the various steps carried out by client application 132 described above in conjunction with FIG. 2. As shown in FIG. 3, the method 300 begins at step 302, where client application 132 provides credentials to the authentication server application 122, as described above in detail in conjunction with step 202 of FIG. 2. At step 304, client application 132 receives an authentication token from the authentication server application 122. According to some embodiments, the authentication token enables client application 132 to interface with authentication server application 122 over a trusted connection and issue requests for content 106 to authentication server application 122. According to some embodiments, the authentication token can take on a variety of forms, e.g., a JavaScript Object Notation (JSON) Web Token), encrypting keys, digital certificates, and the like.

At step 306, client application 132 provides, to authentication server application 122, a request to access content 106, where the request includes the authentication token to enable authentication server application 122 to verify the request, as described above in detail in conjunction with step 204 of FIG. 2. At step 308, client application 132 receives, from authentication server application 122, (i) an authentication URL, and (ii) a content URL associated with the content 106, as described above in detail in conjunction with step 214 of FIG. 2. At step 310, client application 132 causes a web browser 134 to access the authentication URL, as described above in detail in conjunction with steps 216 and 218 of FIG. 2. At step 312, client application 132 determines whether the web browser 134 possesses a session cookie from web server application 112, as described above in detail in conjunction with step 224 of FIG. 2. If, at step 312, client application 132 determines that the web browser 134 does not possess the session cookie from the web server application 112, then the method 300 ends, as the web browser 134 will not be able to effectively access the content URL without the session cookie. According to some embodiments, when step 312 fails, the web browser 134 and/or client application 132 can optionally display an error message indicating that the content 106 cannot be retrieved/displayed within the web browser 134.

Alternatively, if, at step 312, client application 132 determines that the web browser 134 possesses the session cookie from the web server application 112, then the method 300 proceeds to step 314, where client application 132 (1) provides the content URL to the web browser 134, and (2) causes the web browser 134 to access the content URL to obtain the content 106 from the web server application 112, as described above in detail in conjunction with steps 226, 228, and 230 of FIG. 2.

Figure 4A:
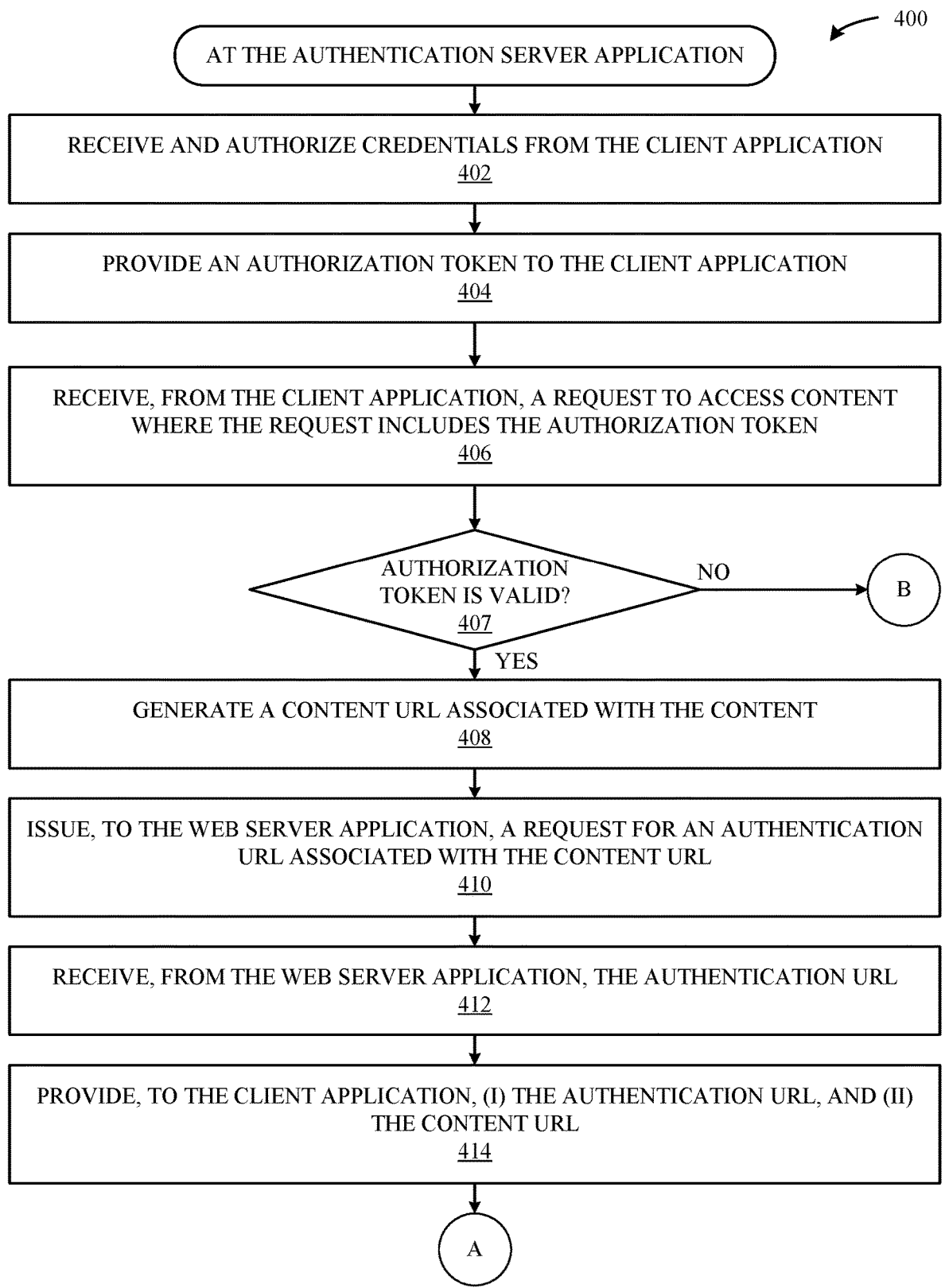
FIGS. 4A-4B illustrate a method performed by an authentication server application executing on an authentication server device, according to some embodiments.
Figure 4B:
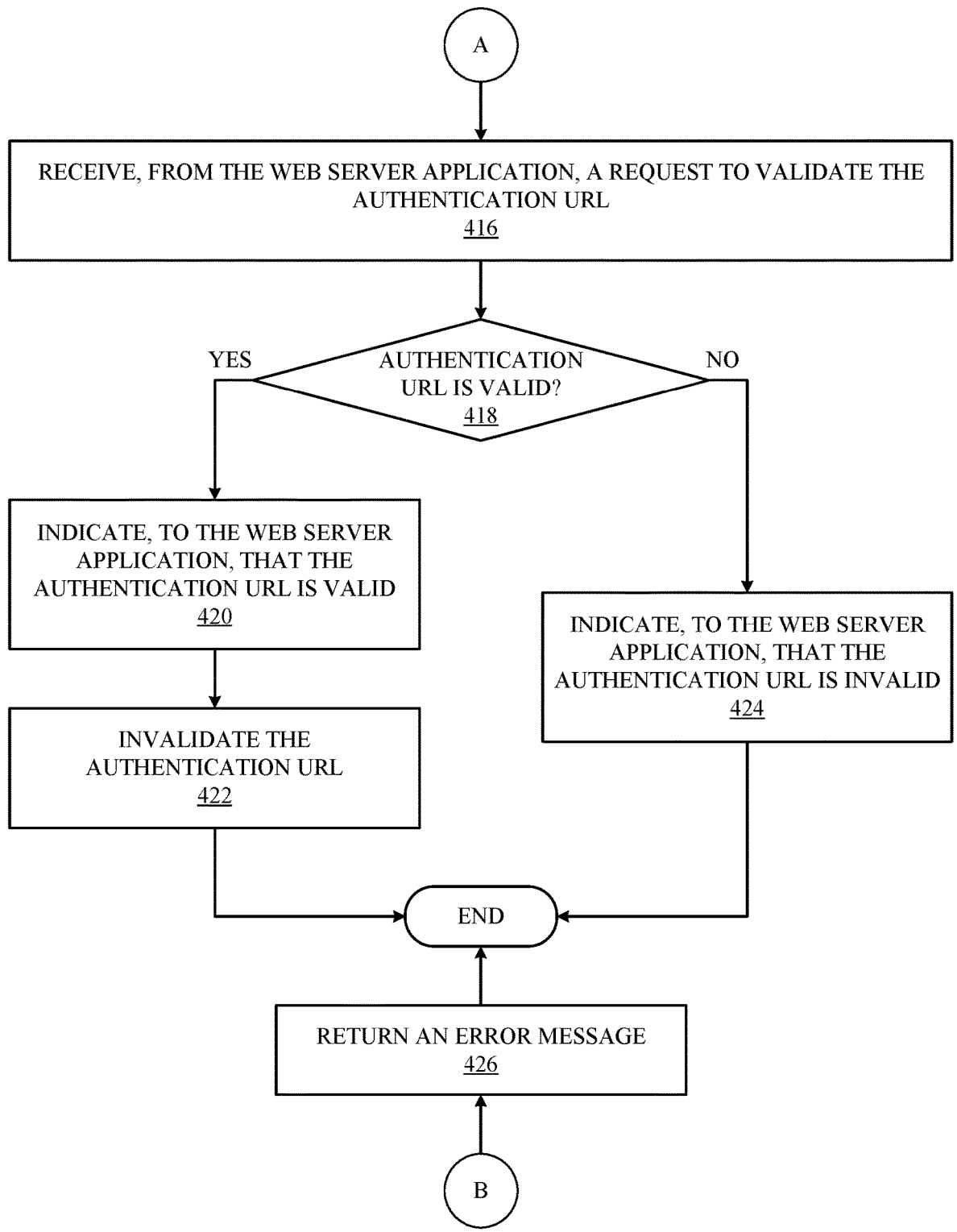

FIGS. 4A-4B illustrate a method 400 performed by authentication server application 122, according to some embodiments. In particular, the method 400 provides a more detailed breakdown of the various steps carried out by authentication server application 122 described above in conjunction with FIG. 2. As shown in FIG. 4A, the method 400 begins at step 402, where authentication server application 122 receives and authorizes credentials from client application 132, as described above in detail in conjunction with step 202 of FIG. 2. At step 404, authentication server application 122 provides an authentication token to client application 132, as described above in detail in conjunction with step 304 of FIG. 3. At step 406, authentication server application 122 receives, from client application 132, a request to access content 106 provided by web server application 112, where the request includes the authentication token, as described above in detail in conjunction with step 204 of FIG. 2 and step 306 of FIG. 3.

At step 407, authentication server application 122 determines whether the authorization token is valid, e.g., by comparing properties of the authorized token against authentication information managed by authentication server application 122. If, at step 407, authentication server application 122 determines that the authorization token is invalid, then the method 400 proceeds to step 426 illustrated in FIG. 4B, where authentication server application 122 returns an error message to client application 132, and the method 400 ends. According to some embodiments, the client application 132 can display an error message that indicates a problem occurred when attempting to retrieve the content 106.

Alternatively, if, at step 407, authentication server application 122 determines that the authorization token is valid, then the method 400 proceeds to step 408, where authentication server application 122 generates a content URL associated with the content 106, as described above in detail in conjunction with step 206 of FIG. 2. At step 410, authentication server application 122 issues, to web server application 112, a request for an authentication URL associated with the content URL, as described above in detail in conjunction with step 208 of FIG. 2. At step 412, authentication server application 122 receives, from web server application 112, the authentication URL, as described above in detail in conjunction with step 212 of FIG. 2. At step 414, authentication server application 122 provides, to client application 132, (i) the authentication URL, and (ii) the content URL, as described above in detail in conjunction with step 214 of FIG. 2.

Turning now to FIG. 4B, at step 416, authentication server application 122 receives, from the web server application 112, a request to validate the authentication URL, as described above in detail in conjunction with step 220 of FIG. 2. At step 418, authentication server application 122 determines whether the authentication URL is valid. If, at step 418, authentication server application 122 determines that the authentication URL is invalid, then the method 400 proceeds to step 424, where authentication server application 122 indicates, to web server application 112, that the authentication URL is invalid. According to some embodiments, step 424 can cause web server application 112 to return an error message to client application 132, whereupon client application 132 indicates (e.g., via a user interface) that the content 106 cannot be obtained. Alternatively, if, at step 418, authentication server application 122 determines that the authentication URL is valid, then the method 400 proceeds to step 420, where authentication server application 122 indicates, to web server application 112, that the authentication URL is valid. At step 422, authentication server application 122 invalidates the authentication URL to prevent the authentication URL from subsequently being accessed by another web browser 134, as described above in detail in conjunction with steps 220 and 222 of FIG. 2.

Figure 5A:
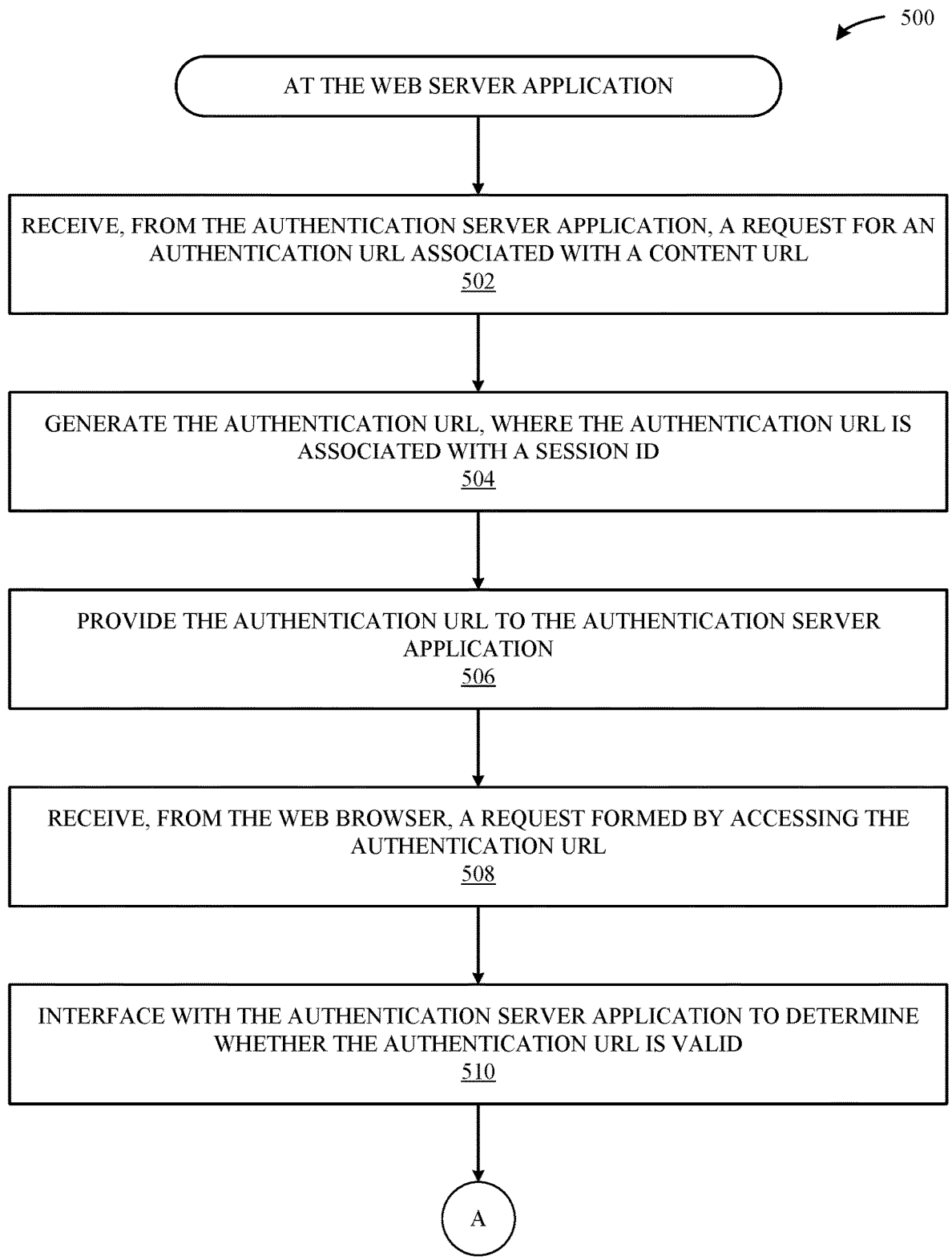
FIGS. 5A-5B illustrate a method performed by web server application executing on a web server device, according to some embodiments.
Figure 5B:
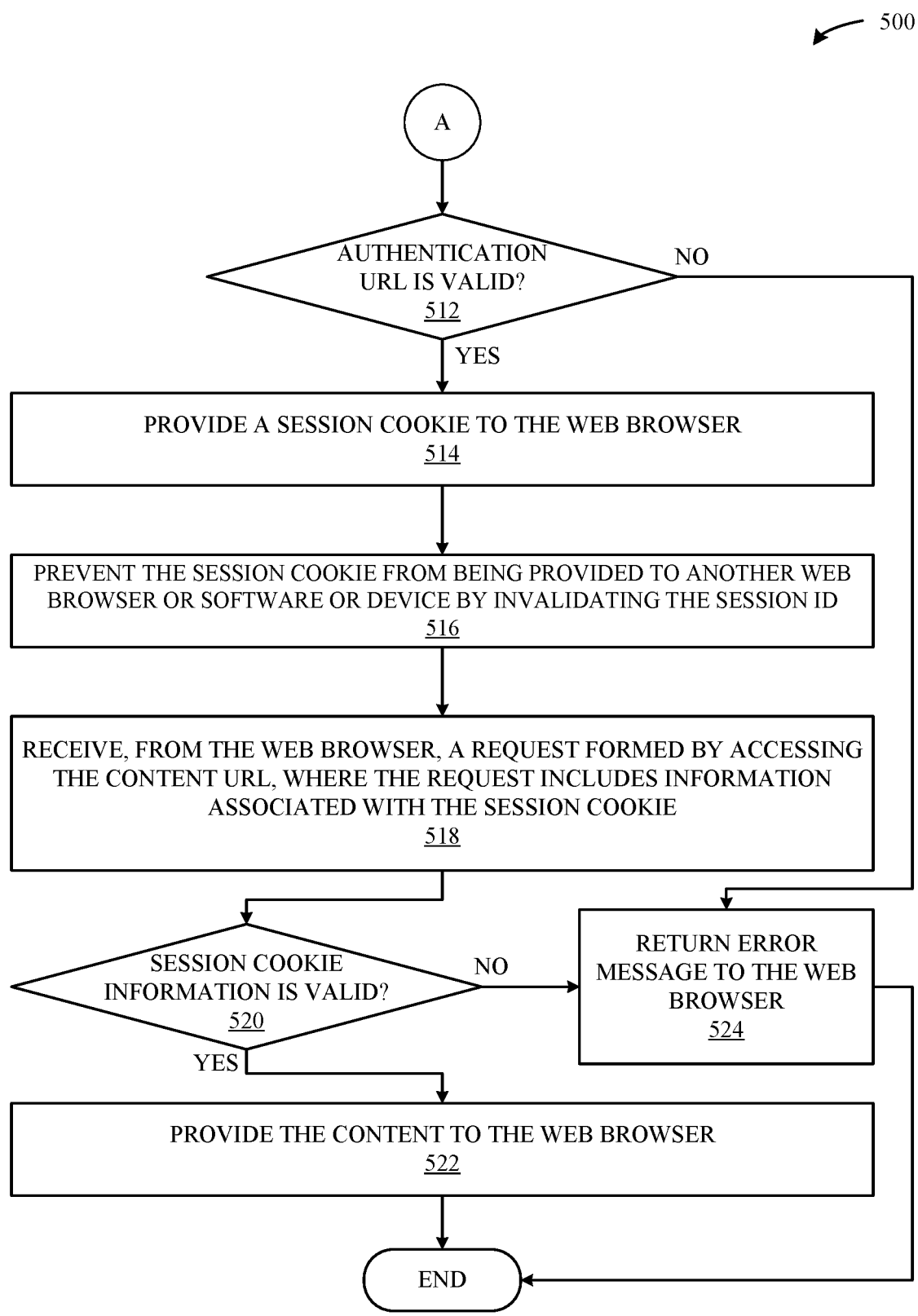

FIGS. 5A-5B illustrate a method 500 performed by web server application 112, according to some embodiments. In particular, the method 500 provides a more detailed breakdown of the various steps carried out by web server application 112 described above in conjunction with FIG. 2. As shown in FIG. 5A, the method 500 begins at step 502, where web server application 112 receives, from authentication server application 122, a request for an authentication URL associated with a content URL generated by authentication server application 122, as described above in detail in conjunction with step 208 of FIG. 2 and step 410 of FIG. 4A. At step 504, web server application 112 generates the authentication URL, where the authentication URL is associated with a session ID, as described above in detail in conjunction with step 210 of FIG. 2. At step 506, web server application 112 provides the authentication URL to the authentication server application 122, as described above in detail in conjunction with step 212 of FIG. 2 and step 412 of FIG. 4.

At step 508, web server application 112 receives, from a web browser 134, a request formed by accessing the authentication URL, as described above in detail in conjunction with step 218 of FIG. 2. At step 510, web server application 112 interfaces with the authentication server application 122 to determine whether the authentication URL is valid, as described above in detail in conjunction with step 220 of FIG. 2 and steps 416 and 418 of FIG. 4B. Turning now to FIG. 5B, at step 512, web server application 112 determines whether the authentication URL is valid. If, at step 512, web server application 112 determines that the authentication URL is invalid, then the method 500 proceeds to step 524, where web server application 112 returns an error message to the web browser 134.

Alternatively, if, at step 512, web server application 112 determines that the authentication URL is invalid, then the method 500 proceeds to step 514, where web server application 112 provides a session cookie to the web browser 134, as described above in detail in conjunction with step 222 of FIG. 2. At step 516, web server application 112 prevents the session cookie from being provided to another web browser or software or device by invalidating the session ID associated with authentication URL, as described above in detail in conjunction with steps 220 and 222 of FIG. 2, and 422 of FIG. 4B. At step 518, web server application 112 receives, from the web browser 134, a request formed by accessing the content URL, where the request includes information associated with the session cookie, as described above in detail in conjunction with step 228 of FIG. 2. At step 520, web server application 112 determines whether the session cookie information is valid. If, at step 520, web server application 112 determines that the session cookie information is valid, then the method 500 proceeds to step 522, where web server application 112 provides the content 106 to the web browser 134. According to some embodiments, the content 106 can be obtained from content provider device 102 (via content application 104), from a storage device local to web server application 112, from a networked storage device, and/or the like. Otherwise, the method 500 proceeds to step 524, where web server application 112 returns an error message to web browser 134, and the method 500 ends.

Figure 6A:
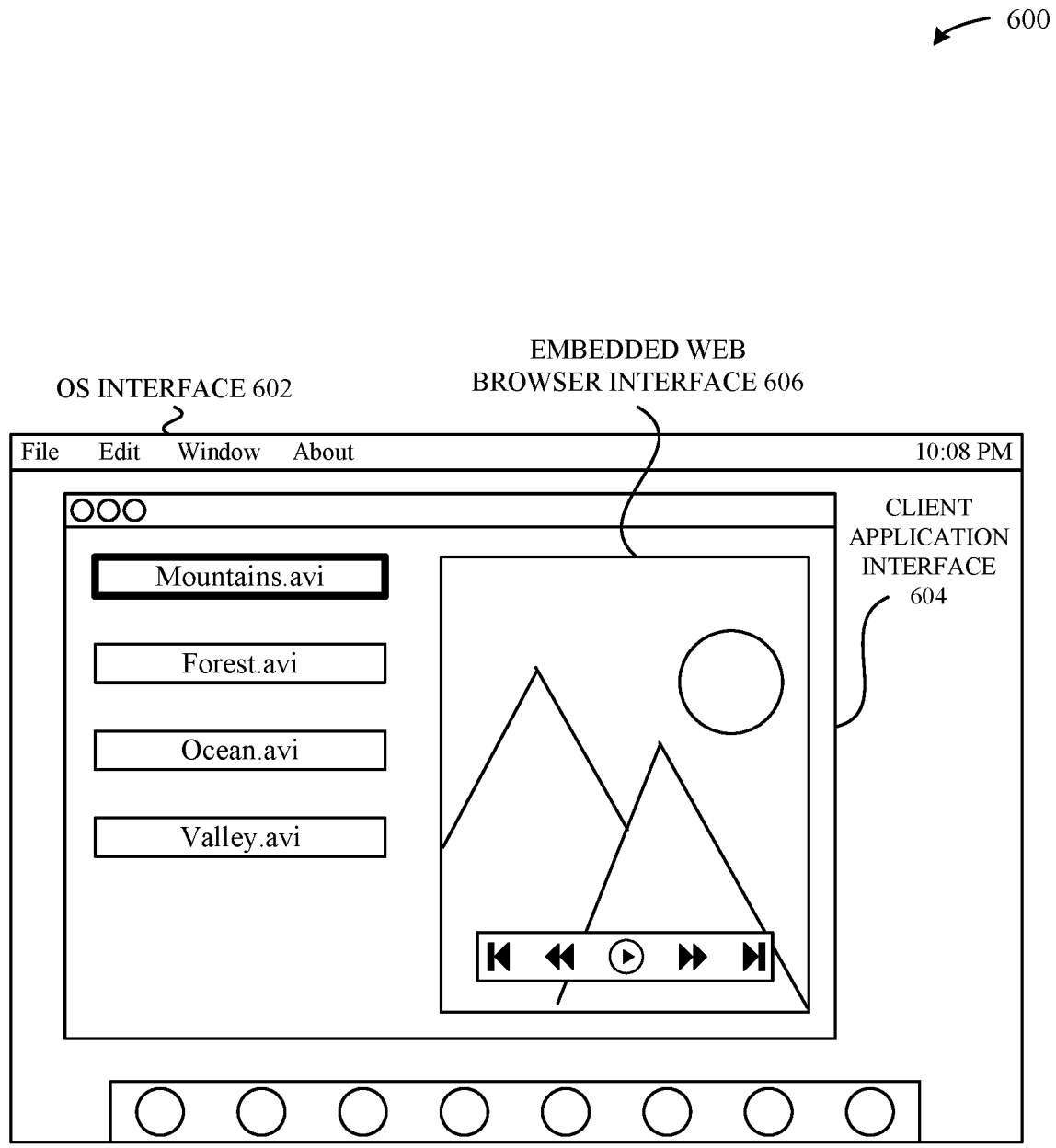
FIGS. 6A-6B illustrate conceptual diagrams of a client application invoking an embedded web browser and an external web browser, respectively, according to some embodiments.
Figure 6B:
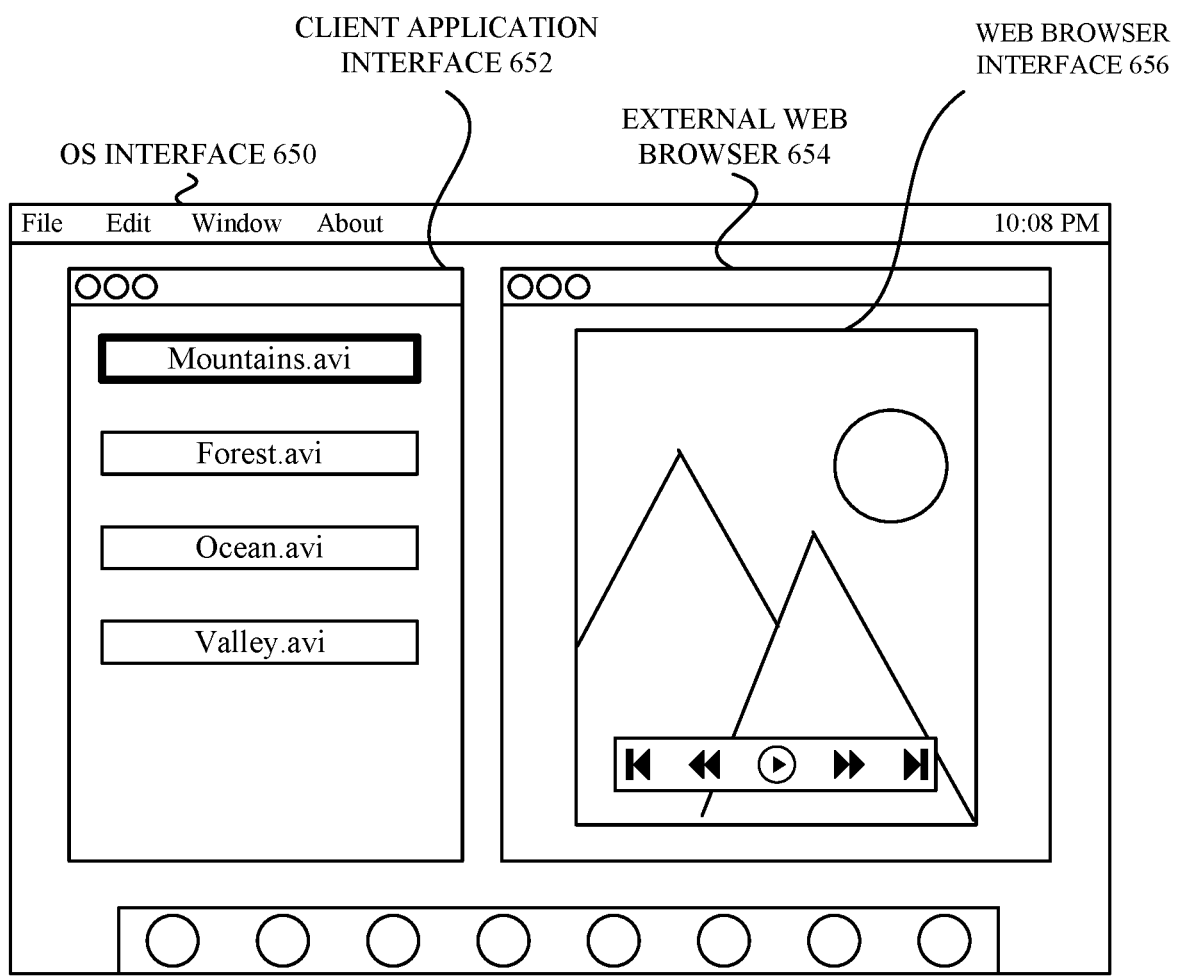

FIGS. 6A-6B illustrate conceptual diagrams 600 and 650 of client application 132 invoking an embedded web browser 134 and an external web browser 134, respectively, according to some embodiments. As shown in FIG. 6A, client device 130 can execute an OS that produces an OS interface 602, where the OS interface 602 includes a client application interface 604 of client application 132. In the example illustrated in conceptual diagram 600, client application interface 604 includes a list of videos for playback (e.g., "Mountains.avi", "Forest.avi", "Ocean.avi", "Valley.avi", etc.). Client application interface 604 also includes an embedded web browser interface 606 of a web browser 134. As previously described herein, client application 132 can include an instance of the web browser 134 through a variety of techniques, e.g., API commands or application messaging. According to some embodiments, when the web browser 134 is embedded within client application 132, the embedded web browser interface 606 of the web browser 134 can exclude the user interface elements commonly found in standalone (i.e., external) application windows, e.g., window controls, toolbars, and the like. As a result, the embedded web browser interface 606 can be configured to display only what is normally displayed within the body of a standalone window, e.g., web content loaded by the web browser 134.

Additionally, and as noted above, FIG. 6B illustrates a conceptual diagram 650 of client application 132 invoking an external web browser 134. For example, as shown in FIG. 6B, client device 130 can execute an OS that produces an OS interface 650, where the OS interface 650 includes a client application interface 652 of client application 132. In the example illustrated in conceptual diagram 650, client application interface 652 includes a list of videos for playback. When client application 132 receives a request to playback one of the videos, the techniques described herein can be carried out to ultimately cause an external web browser 654 having a web browser interface 656 to be loaded (under the control of client application 132), whereupon the video is played within the external web browser 654. In this case, the web browser interface 656 includes the user interface elements commonly found in standalone (i.e., external) application windows, e.g., window controls, toolbars, and the like.

Accordingly, the embodiments set forth herein enable client application 132 to conveniently utilize the various functionalities provided by the web browser 134 (e.g., audio/video playback, animation playback, image & document rendering, etc.) while maintaining security, thereby enabling developers to forego having to build such various functionalities from the ground up within client application 132. In other embodiments, the client application interface 652 can be associated with a messaging or chat program or any application.

Figure 7:
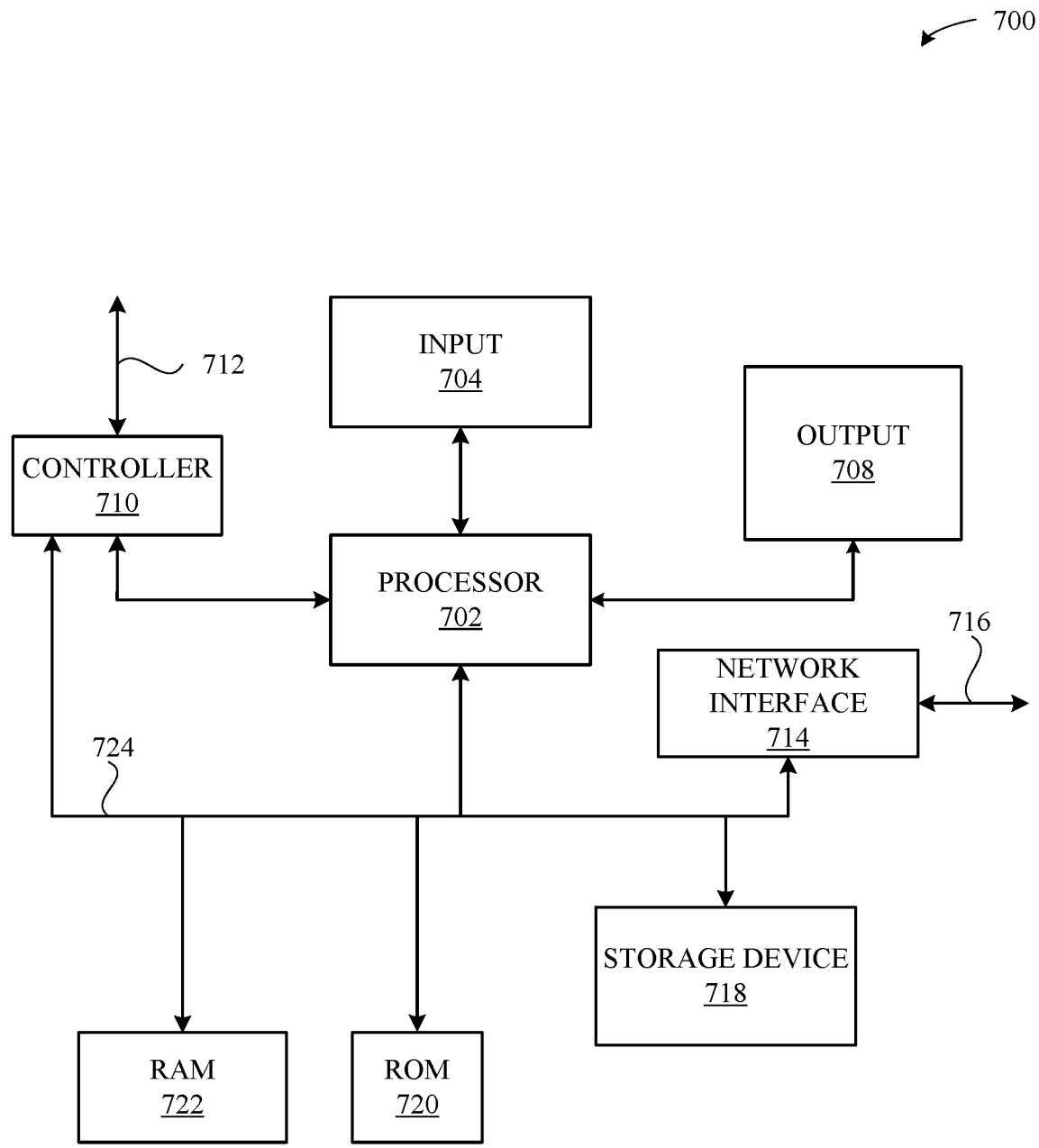
FIG. 7 is a block diagram of a computing device that can represent the components of the different computing devices illustrated in FIG. 1 or any other suitable device for realizing any of the methods, systems, apparatus, and embodiments described herein.

FIG. 7 is a block diagram of a computing device 700 that can represent the components of the different computing devices illustrated in FIG. 1 or any other suitable device for realizing any of the methods, systems, apparatus, and embodiments described herein. It will be appreciated that the components, devices or elements illustrated in and described with respect to FIG. 7 may not be mandatory and thus some may be omitted in certain embodiments. As shown in FIG. 7, the computing device 700 can include a processor 702 that represents a microprocessor, a coprocessor, circuitry and/or a controller for controlling the overall operation of computing device 700. Although illustrated as a single processor, it can be appreciated that the processor 702 can include a plurality of processors. The plurality of processors can be in operative communication with each other and can be collectively configured to perform one or more functionalities of the computing device 700 as described herein. In some embodiments, the processor 702 can be configured to execute instructions that can be stored at the computing device 700 and/or that can be otherwise accessible to the processor 702. In this manner, whether configured by hardware or by a combination of hardware and software, the processor 702 can be capable of performing operations and actions in accordance with embodiments described herein.

The computing device 700 can also include user input device 704 that allows a user of the computing device 700 to interact with the computing device 700. For example, user input device 704 can take a variety of forms, such as a button, keypad, dial, touch screen, audio input interface, visual/image capture input interface, input in the form of sensor data, etc. Still further, the computing device 700 can include an output 708 that can be controlled by processor 702. The output 708 can include a display device, audio device, haptic feedback device, or any other output device suitable for providing output to a user of a device. Controller 710 can be used to interface with and control different equipment through equipment control bus 712. The computing device 700 can also include a network/bus interface 714 that couples to data link 716. Data link 716 can allow the computing device 700 to couple to a host computer or to accessory devices. The data link 716 can be provided over a wired connection or a wireless connection. In the case of a wireless connection, network/bus interface 714 can include a wireless transceiver.

The computing device 700 can also include a storage device 718, which can have a single disk or a plurality of disks (e.g., hard drives) and a storage management module that manages one or more partitions within the storage device 718. In some embodiments, the storage device 718 can include flash memory, semiconductor (solid state) memory or the like. Still further, the computing device 700 can include Read-Only Memory (ROM) 720 and Random Access Memory (RAM) 722. The ROM 720 can store programs, code, instructions, utilities or processes to be executed in a non-volatile manner. The RAM 722 can provide volatile data storage, and store instructions related to components of the storage management module that are configured to carry out the various techniques described herein. The computing device 700 can further include data bus 724. Data bus 724 can facilitate data and signal transfer between at least processor 702, controller 710, network/bus interface 714, storage device 718, ROM 720, and RAM 722.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a client application executing on a remote computing device to access content hosted by a content provider, the method comprising, at an authentication server:
   receiving, from the client application, a first request to access the content, wherein the first request includes an authorization token; and
   in response to validating the authorization token:
      generating a content uniform resource locator (URL) for accessing the content, wherein the content URL references the content;
      issuing, to a web server associated with the content provider, a second request for an authentication URL;
      receiving, from the web server, the authentication URL, wherein the authentication URL is associated with a session ID and a session cookie that are generated by the web server; and
      providing the authentication URL and the content URL to the client application, wherein the client application, in conjunction with receiving the authentication URL and the content URL, causes a web browser executing on the remote computing device to:
         (1) obtain the session cookie from the web server in response to the web server validating the authentication URL and the session ID, wherein the session cookie includes authentication information that enables the content to be accessed via the content URL, and
         (2) access the content from the web server by way of the content URL and the session cookie.

2. The method of claim 1, further comprising, prior to receiving the first request:
   receiving and authorizing credentials provided by the client application; and
   providing the authorization token to the client application.

3. The method of claim 1, further comprising:
   receiving, from the web server, a request to validate the authentication URL; and
   when the authentication URL is valid:
      indicating, to the web server, that the authentication URL is valid; and
      invalidating the authentication URL to prevent future requests received by way of the authentication URL from being validated.

4. The method of claim 1, wherein the content URL expires when the web browser accesses the content URL.

5. The method of claim 1, wherein the web browser is embedded within the client application or is external to the client application.

6. The method of claim 1, wherein the session cookie is based on the authentication URL.

7. At least one non-transitory computer readable storage medium configured to store instructions that, when executed by at least one processor included in an authentication server, cause the authentication server to enable a client application executing on a remote computing device to access content hosted by a content provider, by carrying out steps that include:
  receiving, from the client application, a first request to access the content, wherein the first request includes an authorization token; and
  in response to validating the authorization token:
    generating a content uniform resource locator (URL) for accessing the content, wherein the content URL references the content;
    issuing, to a web server associated with the content provider, a second request for an authentication URL;
    receiving, from the web server, the authentication URL, wherein the authentication URL is associated with a session ID and a session cookie that are generated by the web server; and
    providing the authentication URL and the content URL to the client application, wherein the client application, in conjunction with receiving the authentication URL and the content URL, causes a web browser executing on the remote computing device to:
      (1) obtain the session cookie from the web server in response to the web server validating the authentication URL and the session ID, wherein the session cookie includes authentication information that enables the content to be accessed via the content URL, and
      (2) access the content from the web server by way of the content URL and the session cookie.

8. The at least one non-transitory computer readable storage medium of claim 7, wherein the steps further include, prior to receiving the first request:
  receiving and authorizing credentials provided by the client application; and
  providing the authorization token to the client application.

9. The at least one non-transitory computer readable storage medium of claim 7, wherein the steps further include:
  receiving, from the web server, a request to validate the authentication URL; and
  when the authentication URL is valid:
    indicating, to the web server, that the authentication URL is valid; and
    invalidating the authentication URL to prevent future requests received by way of the authentication URL from being validated.

10. The at least one non-transitory computer readable storage medium of claim 7, wherein the content URL expires when the web browser accesses the content URL.

11. The at least one non-transitory computer readable storage medium of claim 7, wherein the web browser is embedded within the client application or is external to the client application.

12. The at least one non-transitory computer readable storage medium of claim 7, wherein the session cookie is based on the authentication URL.

13. The at least one non-transitory computer readable storage medium of claim 7, wherein the content provider provides the content to the client application in response to verifying the session cookie.

14. An authentication server configured to enable a client application executing on a remote computing device to access content hosted by a content provider, the authentication server comprising:
  at least one processor; and
  at least one memory configured to store instructions that, when executed by the at least one processor, cause the authentication server to:
    receive, from the client application, a first request to access the content, wherein the first request includes an authorization token; and
    in response to validating the authorization token:
      generate a content uniform resource locator (URL) for accessing the content, wherein the content URL references the content;
      issue, to a web server associated with the content provider, a second request for an authentication URL;
      receive, from the web server, the authentication URL, wherein the authentication URL is associated with a session ID and a session cookie that are generated by the web server; and
      provide the authentication URL and the content URL to the client application, wherein the client application, in conjunction with receiving the authentication URL and the content URL, causes a web browser executing on the remote computing device to:
        (1) obtain the session cookie from the web server in response to the web server validating the authentication URL and the session ID, wherein the session cookie includes authentication information that enables the content to be accessed via the content URL, and
        (2) access the content from the web server by way of the content URL and the session cookie.

15. The authentication server of claim 14, wherein the at least one processor further causes the authentication server to, prior to receiving the first request:
  receive and authorizing credentials provided by the client application; and
  provide the authorization token to the client application.

16. The authentication server of claim 14, wherein the at least one processor further causes the authentication server to:
  receive, from the web server, a request to validate the authentication URL; and
  when the authentication URL is valid:
    indicate, to the web server, that the authentication URL is valid; and
    invalidate the authentication URL to prevent future requests received by way of the authentication URL from being validated.

17. The authentication server of claim 14, wherein the content URL expires when the web browser accesses the content URL.

18. The authentication server of claim 14, wherein the web browser is embedded within the client application or is external to the client application.

19. The authentication server of claim 14, wherein the session cookie is based on the authentication URL.

20. The authentication server of claim 14, wherein the content provider provides the content to the client application in response to verifying the session cookie.

* * * * *